J. C. ROWELL.
TREE OR PLANT SUPPORT.
APPLICATION FILED JUNE 24, 1911.
1,025,311.
Patented May 7, 1912.
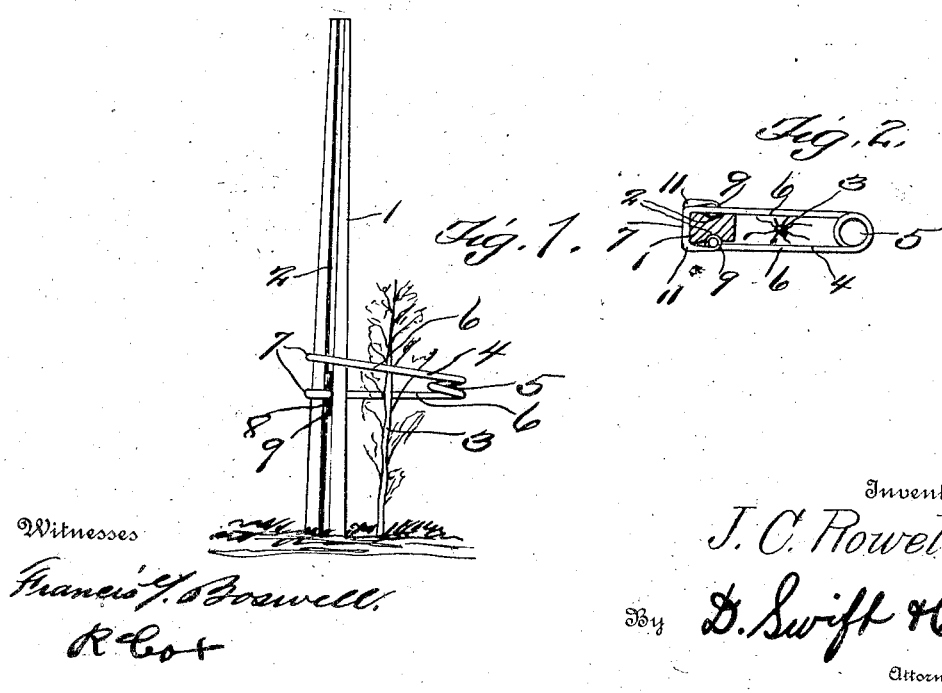

UNITED STATES PATENT OFFICE.

JOHN C. ROWELL, OF TERRA CEIA, FLORIDA.

TREE OR PLANT SUPPORT.

1,025,311.   Specification of Letters Patent.   Patented May 7, 1912.

Application filed June 24, 1911. Serial No. 635,230.

*To all whom it may concern:*

Be it known that I, JOHN C. ROWELL, a citizen of the United States, residing at Terra Ceia, in the county of Manatee and State of Florida, have invented a new and useful Tree or Plant Support; and I do hereby declare the following to be a full, clear, and exact description of the invention, such as will enable others skilled in the art to which it appertains to make and use the same.

This invention relates to a new and useful device for guiding young trees, plants and the like, in their early growth.

The invention in its broadest scope aims as its primary object, the provision of a post used in combination with an especially designed plant support, for holding a plant, tree or the like adjacent and parallel with the post.

Another object of the invention is the provision of means for holding the support securely in position.

The invention comprises further features and combination of parts, as hereinafter set forth, shown in the drawings and claimed.

In the drawings:—Figure 1 is a view in elevation showing the application of the invention. Fig. 2 is a horizontal sectional view of Fig. 1, a little above the plant support.

Referring more particularly to the drawings, 1 designates a vertically arranged post having longitudinal grooves 2 on either of two sides.

The young tree, plant or the like, designated by the numeral 3, is arranged adjacent to and parallel with the post, as shown in the drawings. Heretofore ordinary cord or twine has been utilized for holding the young tree or the like adjacent the post, but the present invention aims to construct and provide a novel tree or plant support designated by the character 4. This support comprises a single length of spring steel wire or like material, coiled once upon itself to form an eye 5 at one end of the support. Extending from the eye upon each side thereof are two spring arms 6, which terminate into angle ends 7. The angle ends 7 are bent upon themselves, as shown at 11, so as to form hooks. These hooks embrace substantially three fourths of the circumference of the post, so as to prevent lateral movement of the plant support 4. These angle ends broaden at their extremities, as shown at 8, and are provided with rolled engaging ends 9, which are designed to seat in the grooves of the post, as shown in the drawings, in order to hold the support properly in position.

From the foregoing it is apparent that there has been produced a simple, novel, cheap and practical device for supporting and guiding young trees, plants and the like during their early growth.

This invention having been set forth, what is claimed as new and useful is:—

In combination, a standard having longitudinal grooves on opposite faces, a support adapted to hold a young tree adjacent to and parallel with the standard, the support comprising a single length of wire constructed in a coil substantially at its central portion, the wire forming parallel arms projecting from the coil, each arm being bent at right angles at two points at its end portion and extending in opposite directions to embrace about three sides of the standard, each arm terminating in an elongated rolled member, the rolled members adapted to engage the longitudinal grooves.

In testimony whereof I have signed my name to this specification in the presence of two subscribing witnesses.

JOHN C. ROWELL.

Witnesses:
W. C. MCLAUGHLIN,
J. M. MCEWEN.